J. F. HICKENBOTTOM.
DAMPER FOR HEATING STOVES.
APPLICATION FILED APR. 6, 1912.
1,061,911. Patented May 13, 1913.
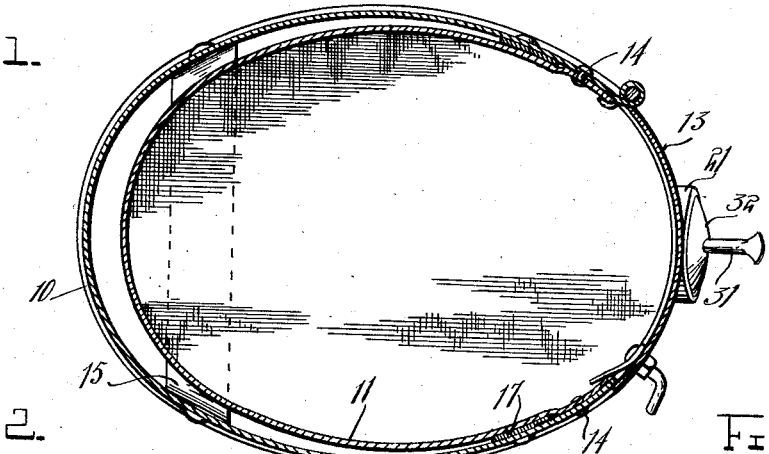
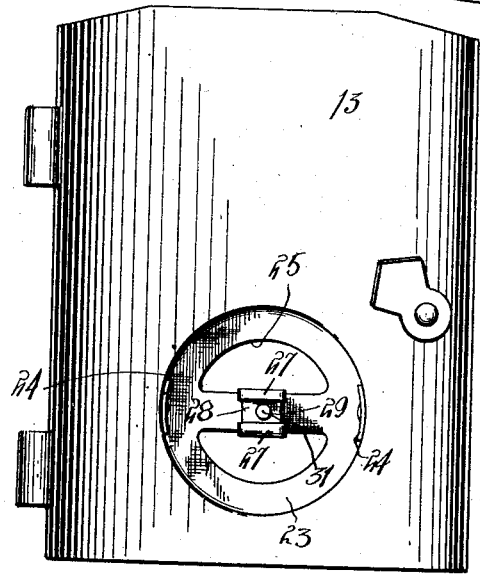 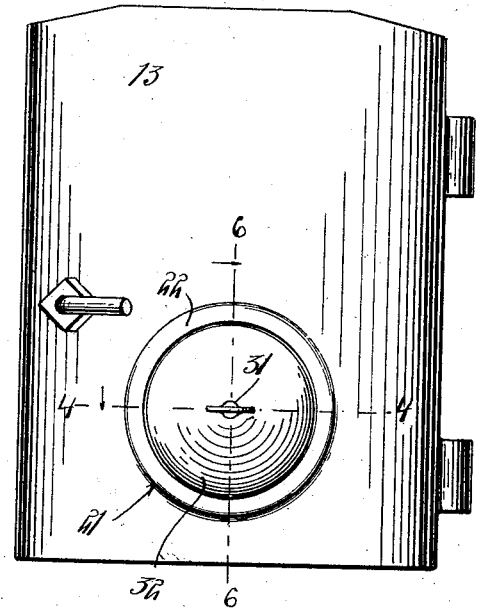
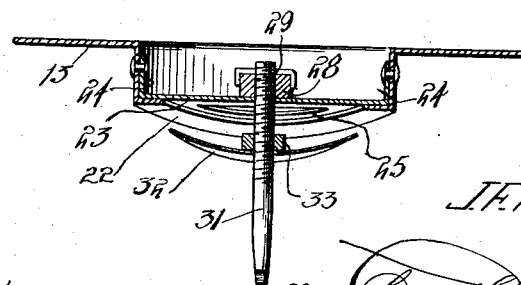
Witnesses
J. C. Simpson
Henry P. Bright
Inventor
J. F. Hickenbottom
By
Attorneys

UNITED STATES PATENT OFFICE.

JAMES F. HICKENBOTTOM, OF FLORA, ILLINOIS.

DAMPER FOR HEATING-STOVES.

1,061,911. Specification of Letters Patent. Patented May 13, 1913.

Application filed April 6, 1912. Serial No. 688,918.

*To all whom it may concern:*

Be it known that I, JAMES F. HICKENBOTTOM, a citizen of the United States, residing at Flora, in the county of Clay, State of Illinois, have invented certain new and useful Improvements in Dampers for Heating-Stoves; and I do hereby declare the following to be a full, clear, and exact description of the invention, such as will enable others skilled in the art to which it appertains to make and use the same.

This invention relates to dampers for heating stoves.

The object of the invention resides in the provision of a damper for heating stoves which will be simple in construction, efficient in use and which may be manufactured and installed at a comparatively small cost.

With the above and other objects in view, the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views, and in which—

Figure 1 is a horizontal section of a heating stove having the improved damper associated therewith. Fig. 2 an inside view of the feed door of the stove detached. Fig. 3 an outside view of the feed door detached, and Fig. 4 a section on the line 4—4 of Fig. 3.

Referring to the drawings, the stove is shown as comprising outer and inner casings 10 and 11 respectively, the former of which has an open bottom while the latter has the greater portion of its side wall disposed in spaced relation to the side wall of the outer casing. The side wall of said inner casing is disposed in engagement with the side wall of the outer casing at the front side of the latter and said engaging portions of the side walls of said casings are provided with registering openings adapted to be closed by a door 13 hinged to the outer casing 10. The inner casing is secured within the outer casing by means of bolts 14.

The door 13 has formed integral therewith an outwardly extending tubular portion 21 provided at its outer end with an inwardly directed flange 22. Disposed against the inner face of the flange 22 is a plate 23 having diametrically oppositely disposed inwardly directed ears 24 suitably secured to the tubular portion 21 to hold the plate in position against the inner face of the flange 22. This plate 23 is provided with spaced openings 25 and also inwardly directed ears 27 disposed at the adjacent edges of said opening and bent so as to retain therebetween a member 28 having a threaded opening 29 extending longitudinally therethrough which registers with an opening 30 formed in the plate 23. Mounted in the openings 30 and 29 is the threaded end of a bolt 31. This bolt carries intermediately a disk 32 secured in place by a locking nut 33 mounted on the threaded end of the bolt 31. By this construction it will be apparent that the bolt 31 may be manipulated toward and away from the plate 23 so as to close or uncover the openings 25 and thus control the draft of the stove.

What is claimed is:

In a heating stove the combination of a body having an opening therein, a door hinged to the body for closing said opening, said door being provided with an opening in its lower end, an outwardly extending tubular portion, an inwardly directed flange on the outer end of said portion, a plate disposed against the inner face of said flange and secured to the tubular portion, said plate being provided with spaced openings, inwardly bent ears at the adjacent edges of said openings, a block clamped between said ears provided with a threaded passage and registering with an opening in said plate, a bolt mounted in said threaded passage, a disk carried by said bolt and disposed outwardly of said plate whereby the rotation of the bolt will move the disk to cover and uncover the openings in the plate, and said outer casing being provided with perforations in its top portion.

In testimony whereof, I affix my signature, in presence of two witnesses.

JAMES F. HICKENBOTTOM.

Witnesses:
F. E. GOLDSBY,
WILL CHANEY, Jr.

Copies of this patent may be obtained for five cents each, by addressing the "Commissioner of Patents, Washington, D. C."